Nov. 23, 1943. W. W. O'NEAL ET AL 2,334,949
DEHYDRATOR
Filed Jan. 13, 1941 2 Sheets-Sheet 1
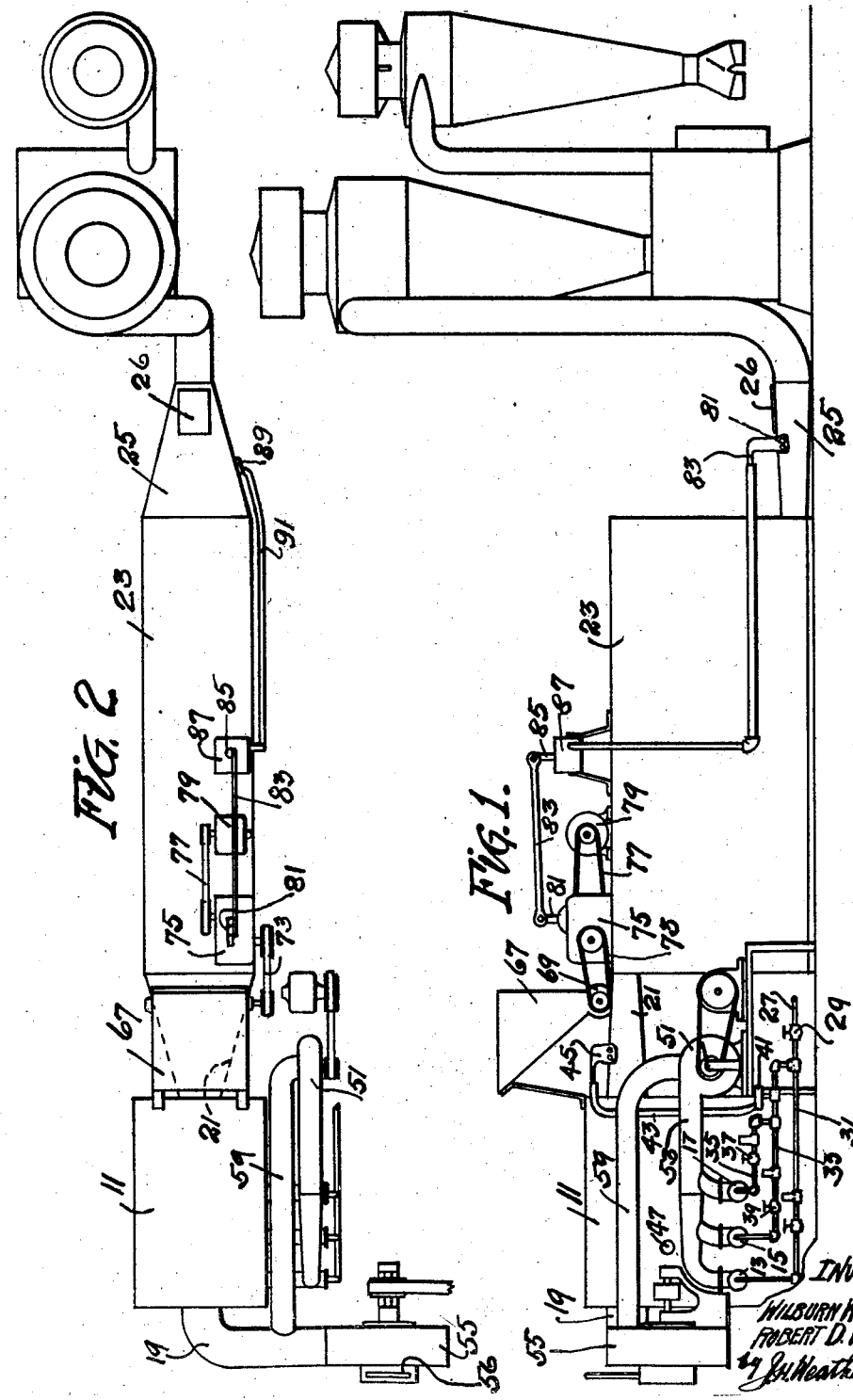
INVENTORS
WILBURN W. O'NEAL
ROBERT D. WILLIAMS

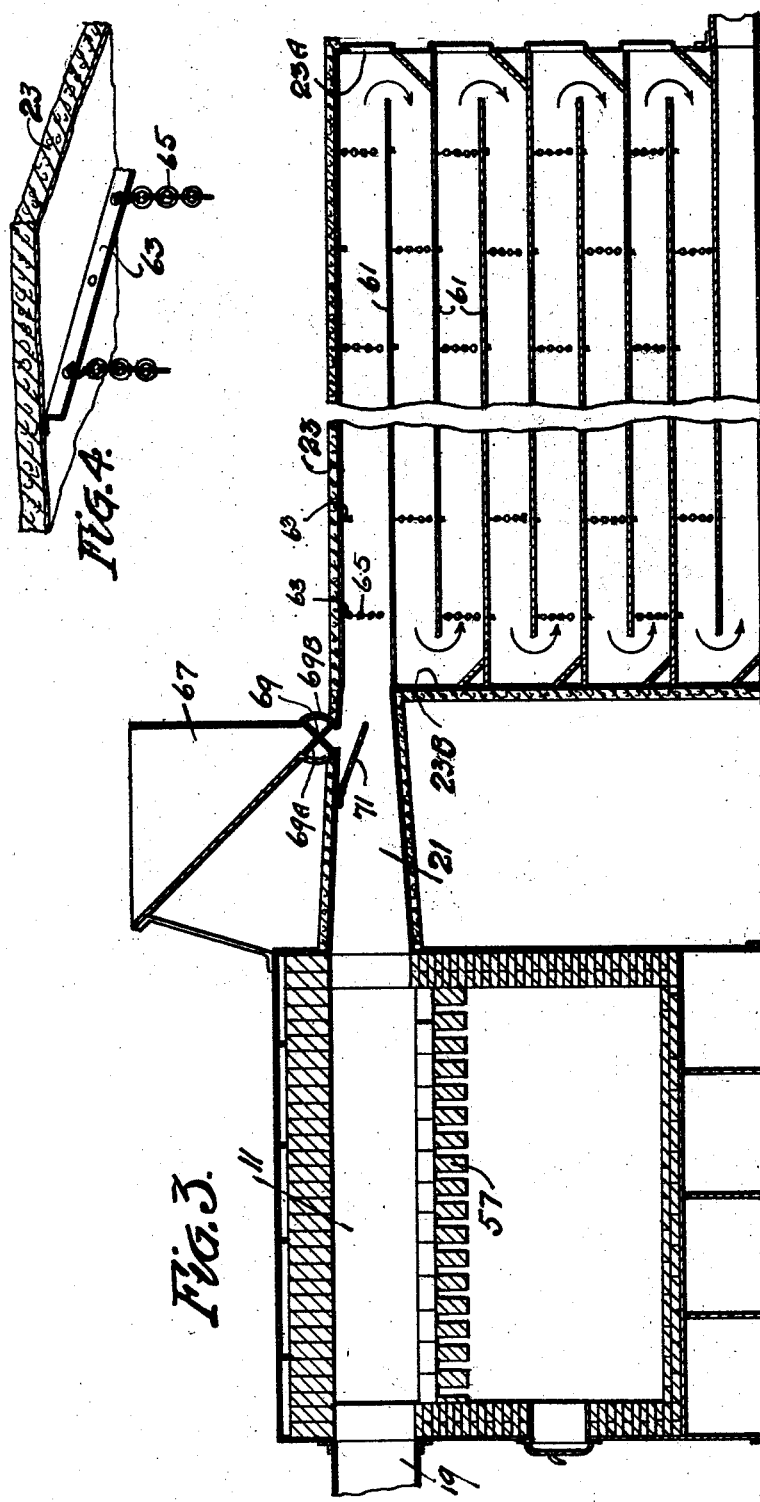

Patented Nov. 23, 1943

2,334,949

UNITED STATES PATENT OFFICE 2,334,949

DEHYDRATOR

Wilburn W. O'Neal and Robert L. Williams, Memphis, Tenn.; said Williams assignor to said O'Neal Application January 13, 1941, Serial No. 374,212

7 Claims. (Cl. 263—21)

This invention relates to improvements in apparatus for dehydrating forage crops or other materials requiring either surface drying or removal of contained moisture.

Forage crops as they come from the fields contain a large amount of moisture which must be removed in order that they may be safely stored, and the same is also true of numerous other things, such as sea weed, grains and the like.

Many attempts have been made to remove the moisture by passing through the materials highly heated air with varying degrees of success. Among these treatments are those which employ extremely high temperature furnace gases, modify the temperature of these gases by the introduction of air and traverse the materials to be dried by this tempered air, these methods so far as is known setting up air flow by exhausting the air at the discharge end of the drier, regulating the temperature of the gases or tempered air used and the rate of introduction of the materials solely by the temperature at the discharge end of the drier.

These methods are open to the serious objection that the exhaust currents of air inherently tend to draw away from, rather than be forced into the mass of material to be dried and extreme unevenness of action is accomplished, particularly where heavy stem forage plants, sea weed or the like are to be treated. They are further objectionable in that they set up a fluctuation of temperature which varies from undesirable high to undesirable low alternately tending to overheat or even burn the product or underheat and underdry it, and further complicate this by reducing the amount of material introduced at the same time they increase the temperatures tending to overdry or even burn the material, and by increasing the feed at the same time that they decrease the temperatures accentuating the also undesirable underdrying effect, both to such an extent that the results are far from satisfactory.

The present device contemplates the establishment of a controlled but uniform temperature in the furnace, a controlled but uniform flow of air under pressure, preferably through the furnace to complete combustion therein and establish constant flow of uniformly tempered air under pressure to and through a drying chamber and to discharge; regulating and insuring the constant temperature of this air substantially at its point of entrance to the drier, feeding into this constant volume and temperature current the material to be dried and accomplishing the uniformity of dried products by regulation of the feed in accordance with the temperature at the point of discharge from the drier.

The present method contemplates in addition to the mixing of the air and product afforded by introducing the product into a pressure current, the deflection of the current in the upper portions of the passageways to throw said current against, and to set up in such current an agitation increasing the tendency of the currents to mix with the materials being moved thereby.

Primarily the present description has been largely concentrated on apparatus for dehydrating leafy leguminous forage plants and grasses.

The objects of the invention are:

To provide apparatus which will uniformly and rapidly dehydrate comminuted leafy plants, including the stalky portions as well as the leaves, without excessive overdrying of the lighter parts thereof, while accomplishing a thorough drying of the heavier or stalk portions.

To provide dehydrating apparatus in which the temperature of the dehydrating air is controlled at its point of entrance to the drying chamber.

To provide dehydrating apparatus in which the heated air entering the drying chamber will be substantially free from uncombined oxygen.

To provide dehydrating apparatus in which the feed of the drying material into the stream of drying air is automatically regulate by the temperature of the dried and discharged products and to generally provide means for improving the design and construction of such apparatus.

To provide dehydrating apparatus in which the drying air is introduced at a maintained uniform temperature and volume and the regulation of drying is accomplished by the rate of feed of the materials into said current.

The means by which the foregoing and other objects are accomplished and the method of their accomplishment will readily be understood from the following specification upon reference to the accompanying drawings, in which:

Fig. 1 is a side elevation of the apparatus.

Fig. 2 is a corresponding plan view.

Fig. 3 is a longitudinal sectional elevation on an enlarged scale of the preferred form of furnace and dryer; and Fig. 4 is a perspective view showing the baffle more in detail and on a larger scale.

Referring now to the drawings in which the various parts are indicated by numerals:

11 is a tightly closed heating chamber of furnace, which is preferably provided with a plurality of heating burners 13, 15 and 17, and a forced draft air inlet 19, this heating chamber being in communication through a connecting flue 21 with a drying chamber 23 through which the materials to be dried are moved by air currents under pressure, and from which the dried products are discharged, by the forced air draft, through an outlet flue 25 to suitable collecting apparatus, here indicated but not specifically referred to. 26 is an observation door on the flue which may be opened for examination of the dried products.

The burners 13 and 17 are supplied with fuel, either liquid or gaseous, from a source not shown, through a pipe 27, here indicated as of size for liquids, which may be entirely cut on or off or regulated in part by a valve 29. This feed pipe 27 delivers fuel through one branch 31 to the burner 13 which is fueled at full capacity so long as the apparatus is in use and acts as a pilot burner. Fuel to the burners 15 and 17 feeds through additional branches 33 and 35 respectively, these branches being provided with manually operable individual cut-off valves 37, 39, and jointly with a thermostatically controlled fuel valve 41, the valve 41 being coupled by suitable wiring 43 with a thermostat 45 of a commercial type extending into the flue 21 connecting the heating chamber 11 and the dryer 23. 47 is a thermometer indicating furnace temperatures.

Fuel fed to the burners 13, 15 and 17, if liquid, is vaporized, or if gaseous is mixed with and forced into the heating chamber 11 by air as from a motor driven blower 51 through a main pipe 53 and suitable branches. Air for completing combustion, tempering the combustion temperatures, and subsequently transporting the materials through the drying chamber, is furnished by a pressure fan or blower 55 which discharges through the air inlet 19 into the heating chamber 11. 56 is a valve or gate adjustable to regulate intake air flow to the blower. Preferably the heating chamber is divided by a checker work 57, as of fire brick, into a lower chamber in which combustion largely occurs and a superposed upper chamber, the checker valve preventing undue disturbance in the combustion chamber and combustion in such chamber maintaining a high temperature of the checker work, and insuring transfer of heat, and if necessary, final completion of combustion in the upper chamber. As has been stated, the chamber 11 is a closed chamber and, therefore, operates under the pressure set up by the fan 55. In order that the burner vaporizing fan may properly operate against this pressure a by-pass 59 is established from the discharge pipe of the fan 55 to the suction side of the fan 51, balancing out the effect of furnace pressures on fuel and vaporizing injection.

The drier chamber 23 is provided with a plurality of horizontally disposed shelves 61 which alternately terminate short of the discharge and intake ends 23—A, 23—B of the chamber, the upper of these shelves being substantially at the level of the bottom of the connecting flue 21 and terminating short of the discharge end 23—A of the drier chamber so that materials traversed along the shelf will drop downward at the end thereof onto the next lower shelf and be reversely traversed along such shelf which in turn terminates short of the intake end, allowing the material to drop to the succeeding underlying shelf, etc. The dried materials are finally traversed through the outlet flue 25 to the collecting apparatus. The furnace 11, the drier chamber 23 and the communicating flue 21 are preferably enclosed in suitable insulating material to conserve the heat therein. Transversely disposed across the chamber at predetermined spaced intervals are shallow baffle bars 63 which depend from the underside of the top wall of the chamber and from the underside of the successively underlying shelves 61. These baffle bars deflect and downwardly divert the air flow in the upper portions of the passageways established by the top and shelves and mix same more thoroughly with the materials transported. Preferably the bars are provided from time to time with holes into which short lengths of flexible baffle 65, preferably chains, may be hooked, the chains being short enough when so supported to hang free of the respectively underlying shelves, and serve to break up masses of the materials being transported by the air.

67 is a hopper into which materials to be dried are fed in any suitable or desired manner. Ordinarily the leguminous plants, grasses or other material is chopped into desired lengths and fed by suitable mechanism, not here shown, into the hoppers of known commercial type, which feeder includes a shaft and solid blades 69—A extending at spaced intervals outward from the shaft, ordinarily four or six blades being provided. The blades 69—A fit closely in opposit ly disposed arcuate walls 69—B of the hopper, these walls being of sufficient height to insure the engagement at all times of at least one blade on each side of the shaft, and the resulting structure being substantially sealed against the escape of air.

Preferably the hopper and feeder extend substantially the full width of the connecting flue 21 over which they are placed, the hopper discharging from the feeder through a suitable opening in the top wall of the passageway. Immediately below this discharge opening is a baffle plate 71 which extends from side to side of the passageway and is so placed as to form a Venturi type throat increasing the air velocity adjacent the opening from the feeder and insuring complete discharge from the feeder.

The feeder is driven as though pulleys and a belt 73 from a variable speed drive 75, of commercially known type, the drive in turn being powered as through a belt 77 and suitable pulleys, as by a motor 79. This drive has the usual shift arm 81 through which speed variation is accomplished and is typically connected as by a link 83 with the complementary arm 85 of a commercially known damper motor 87. Mounted on the outlet flue 25 is a thermostat 89, which is connected by suitable wiring leads 91 with the damper motor 87, through this motor operating the shift arms 85 and 81 and controlling the speed of the feeder 69.

In use the pressure fan 55 is started and the discharge flow desired set up through the furnace and driers. Fuel feed is set up through the pipe 27 to the burners 13, 15 and 17, the vaporizing blower 51 is started, the burners lighted and the approximate temperature desired in the flue 21 is established by regulating the flow of fuel to the burners by their respective control valves. The thermostat 45 is then connected to the automatic regulating valve 41 and adjusted to maintain such temperature, and the control of the temperature turned over to the thermostatically controlled valve 41.

Suitably prepared material for drying is placed in the hopper 67, the hopper subsequently being kept full of such material, and the motor 79 started to operate the feeder 69 through the variable speed control 75. The material dropped by the feeder 69 into the intake flue 21 is traversed by the air flow from the pressure fan 55 through the drier 23, being moved first along the upper shelf toward the discharge end of the drier; thence dropping downward and being moved back along the second shelf and the operation continued until eventual discharge is had through the discharge flue 25. In this movement the depending baffle bars 63 deflect the upper stratum of the air currents into the mass of material and the depending baffles 65 to break up this mass and retard the heavier particles, as the stems of the materials, permitting the lighter portions, as the leaves which require less drying effort, to be advanced more rapidly. Eventually the dried product is discharged through the flue 25 into the receiving apparatus.

Observation of the dried materials is made, as through the door 26, and the speed of the feeder adjusted until a desired balance is reached and a properly dried product produced. Thereafter the damper motor 87 is connected to the thermostat 89 and the thermostat adjusted to regulate the speed. Should the product discharged through the flue 25 increase in moisture the temperature of the product and air current is correspondingly decreased and responsively the thermostat acts through the damper motor and speed control 75 to decrease the speed of the feeder until proper balance is again restored. On the other hand should the material fed in be drier than normal the resulting dried material would also be drier than normal, the discharge temperature would be higher and the thermostat would act to speed up the feeder and establish a proper balance.

We claim:

1. In a dehydrator employing a closed furnace chamber and a fuel burner effecting combustion in said chamber, a closed drying chamber, having at one end an outlet for discharge of air and material and its opposite or inlet end in communication with said furnace chamber, and pressure sealed means for feeding a product to be dried into the inlet end of said drying chamber; means for establishing a material traversing flow of air under pressure into said furnace chamber in intermingling contact with combustion gases thereof, and therefrom into said inlet end of, and through said drying chamber, means controlled by the temperature of traversing air entering said drying chamber for controlling the temperature of said furnace chamber, and means controlled by the temperature at the discharge point of said drying chamber for controlling the rate of feed of undried material to said drying chamber.

2. In a dehydrator employing a closed furnace chamber and a fuel burner effecting combustion in said chamber, a closed drying chamber having at one end an outlet for discharge of air and material and its opposite or inlet end in communication with said furnace chamber, and pressure sealed means for feeding a product to be dried into the inlet end of said drying chamber; means for establishing a material traversing flow of air of substantially constant volume and pressure into said furnace chamber in intermingling contact with combustion gases thereof, and therefrom into said inlet end of, and through said drying chamber, means controlled by the temperature of traversing air entering said drying chamber for controlling the temperature of said furnace chamber, and means controlled by the temperature of air and products leaving said drying chamber for controlling the rate of feed of undried material to said drying chamber.

3. In a dehydrator employing a closed furnace chamber and a fuel burner effecting combustion in said chamber, having an outlet opening, a closed drier having an opening for discharge of air and material at one end, and at its opposite end an intake opening and a contiguous feeder opening, a flue establishing communication between said chamber outlet and said drier intake, and pressure sealed feeder means mounted to discharge through said feeder opening into said drier; means for establishing through said furnace chamber in intermingling contact with combustion gases thereof, a substantially constant volume and pressure of air for traversing flow through said drier, means for maintaining said air at substantially constant temperature in said communicating flue, and means controlled by the exit temperature of the air from said discharge opening for controlling the rate of delivery of undried materials from said feeder into said drier.

4. A dehydrator comprising a closed furnace chamber and a fuel burner effecting combustion in said chamber, having an outlet opening, a closed drier having an opening for discharge of air and material at one end, and at its opposite end an intake opening and a contiguous feeder opening, a flue establishing communication between said chamber outlet and said drier intake, and pressure sealed feeder means mounted to discharge through said feeder opening into said drier; manually controllable means for establishing through said furnace chamber in intermingling contact with combustion gases thereof a substantially constant volume and pressure of air for traversing flow through said drier, means for maintaining said air at substantially constant temperature in said communicating flue, and means automatically controlled by the exit temperature of the air from said discharge opening for controlling the rate of delivery of undried materials from said feeder into said drier.

5. In a dehydrator, a closed heating chamber, a closed drying chamber, having a discharge outlet, an air flue for establishing communication between said heating chamber and said drying chamber, a pressure-sealed feeder for delivering materials into said drying chamber adjacent the entrance of said air flue thereinto, means for establishing substantially constant volume flow of air under substantially constant pressure through said heating chamber, a plurality of burners in said heating chamber, means for furnishing a fuel delivering flow of air to said burners, by-pass means from said air pressure establishing means to said fuel delivering air flow means, means for regulating fuel flow to said burners, heat responsive means in said air flue for controlling said fuel flow regulating means, means for regulating the speed of said feeder means, and heat responsive means disposed in said outlet from said drying chamber for thermostatically controlling said speed regulating means.

6. In a dehydrator, a closed heating chamber, a closed drying chamber, having a discharge outlet, an air flue for establishing communication between said heating chamber and said drying chamber, a pressure-sealed feeder for delivering materials into said drying chamber adjacent the entrance of said air flue thereinto, means for establishing substantially constant volume flow of air under pressure through said heating chamber, a plurality of burners in said heating chamber, means for furnishing a fuel delivery flow of air to said burners, by-pass means from said air pressure establishing means to said fuel delivering air flow means, means for regulating fuel flow to said burners, heat responsive means in said air flue for controlling said fuel flow regulating means, means for varying the speed of said feeder means, and heat responsive means disposed in said outlet from said drying chamber for thermostatically controlling said speed varying means.

7. In a dehydrator, a closed heating chamber, a closed drying chamber, having a discharge outlet, an air flue for establishing communication between said heating chamber and said drying chamber, a pressure-sealed feeder for delivering materials into said drying chamber adjacent the entrance of said air flue thereinto, means for establishing substantially constant volume flow of air under pressure through said heating chamber, a burner in said heating chamber, means for furnishing a fuel delivery flow of air to said burner, by-pass means from said air pressure establishing means to said fuel delivering air flow means, means for regulating fuel flow to said burner, temperature responsive means in said air flue for controlling said fuel flow regulating means, means for varying the speed of said feeder means, and temperature responsive means disposed in said outlet from said drying chamber for thermostatically controlling said speed varying means.

WILBURN W. O'NEAL.
ROBERT D. WILLIAMS.